Aug. 22, 1961 W. K. MacADAM 2,997,697

DATA TRANSMISSION SYSTEM

Filed July 8, 1959 2 Sheets-Sheet 1

INVENTOR
W. K. MacADAM
BY
Kenneth B Hamlin
ATTORNEY

DATA TRANSMISSION SYSTEM

Filed July 8, 1959 2 Sheets-Sheet 2

INVENTOR
W. K. MacADAM
BY
Kenneth B. Hamlin
ATTORNEY

United States Patent Office 2,997,697 Patented Aug. 22, 1961

2,997,697

DATA TRANSMISSION SYSTEM

Walter K. MacAdam, Valhalla, N.Y., assignor to American Telephone and Telegraph Company, New York, N.Y., a corporation of New York Filed July 8, 1959, Ser. No. 825,697
10 Claims. (Cl. 340—174.1)

Figure 1:
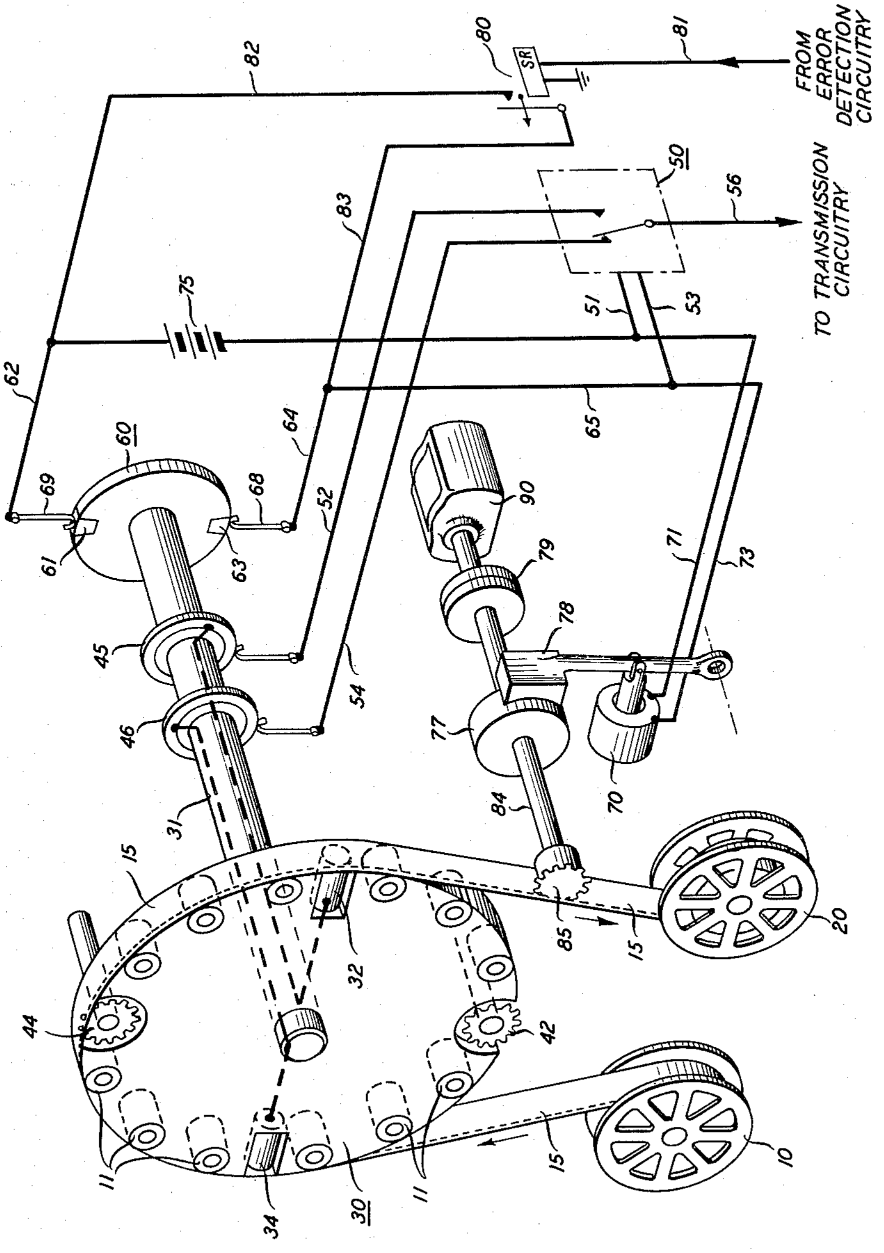

This invention relates to data transmission systems and more specifically to the retransmission of information in such systems employing tape storage. It has for its general object the improvement and simplification of such systems.

Many data transmission systems use magnetic or punched tape for the storage of digital information. These systems usually include at least two reels which rotate to take up and to let out the tape, allowing it to move adjacent to a sensing element located between the reels. Longitudinal movement is imparted to the tape through a motor-driven capstan, which may be coupled to the tape by any of the known methods. Advantageously, the tape is driven continuously in one direction at a high rate of speed, and the sensing element "reads" the information stored thereon for transmission.

The information stored on the tape may be in the form of magnetized sections representing stored pulses, or in the form of a multiunit code punched on a tape or in any of the known forms of storage of information on a tape. For purposes of error detection, the information is stored in the form of, or is translated to, a protected code for transmission. At the receiving apparatus, the transmitted information is checked to determine whether it is a valid signal or whether it has been mutilated during transmission. If the latter is indicated, a request is automatically sent back to the transmitting circuitry for retransmission of the multilated signal. The tape is advancing continuously, and by the time the request arrives at the transmitting circuitry, the information that was transmitted improperly has moved some finite distance past the sensing element.

In known systems the tape is stopped upon receipt of the error request for retransmission and is moved in the reverse direction to the information that was transmitted improperly. The tape is then caused to proceed again in the forward direction and the information is retransmitted, along with the succeeding information that had been previously transmitted up to the point where the tape was stopped. Appreciable mechanical strain and loss in time is introduced by stopping and reversing the tape, and this has been found to be an inconvenient and uneconomical solution to the problem of retransmitting multilated information.

Other known data transmission systems have employed means for temporarily storing information signals and repeating them in response to an error signal. Complex circuits of interconnected electromechanical relays have been used for this purpose, and one known system employs a separate rotating magnetic drum to perform the storage function. The former has disadvantages related to speed of operation, cost, maintenance and reliability, while the latter requires complex circuitry and expensive excess storage apparatus.

Accordingly, one object of my invention is to provide means for retransmitting information from a tape when an error is detected without stopping and backspacing the tape.

It is another object of my invention to provide means for retransmitting information from a tape when an error is detected without additional storage apparatus.

A further object of the invention is to provide means for retransmitting information from a tape when an error is detected while maintaining continuous forward movement of the tape relative to the sensing element.

The above and other objects are attained in illustrative embodiments of the present invention by using at least two pickup transducers, or sensing elements, positioned a predetermined distance from each other and adjacent to an information-bearing tape. When one transducer is "reading" the information from the continuously moving tape, a second transducer is positioned a predetermined distance along the direction of travel of the tape. In response to an error signal, the "reading" operation is switched to the second transducer, and the second transducer assumes the position of the first transducer relative to the tape, such that at all times there is a forward transducer which is "reading" the information from the tape and a second transducer positioned to the rear thereof for retransmission when subsequent errors are detected.

In accordance with one aspect of the present invention, a pair of transducers are positioned a predetermined distance from each other on the circumference of a normally stationary turntable; and, a continuously moving, information-bearing tape is passed around a portion of the circumference of the turntable so as to be adjacent to each of the two transducers. Two continuously rotating, constant-speed sprocket wheels are positioned along the circumference of the turntable, arranged such that at least one of them is always engaging sprocket holes in the tape. Drive is supplied to the tape through a sprocket wheel capstan which normally rotates at the same speed as the constant-speed sprocket wheels on the turntable.

Normally the forward transducer, relative to the direction of movement of the tape, is connected to output circuitry and is sensing the stored information. When an error in transmission is detected, switching circuitry responds to an error signal and connects the output circuitry to the rear transducer which immediately starts a repeat transmission of the information. At the same time, a brake causes a decrease in the speed of the driving capstan. Since the sprocket wheels on the turntable are rotating at a constant speed, the turntable will begin to rotate in a direction opposite to the movement of the tape, maintaining the relative speed between the transducer and the tape constant. The transducer connected to the output circuitry will rotate to the forward position, at which point the brake is removed from the driving capstan, allowing it to resume its original speed of rotation. Thus, the two transducers interchange relative positions and the mutilated information is retransmitted, and at all times the tape is continuously moving in the forward direction relative to the transmitting transducer.

In accordance with another embodiment of the present invention, a differential gear drive is provided which forcibly relates the speed of rotation of the turntable to the tape speed such that the relative speed between the tape and the "reading" transducer is maintained without the use of sprocket holes. A differential gear box is driven at a constant speed, a first output shaft of which is coupled to a capstan driving the tape and a second output shaft of which is coupled to the turntable. The turntable is subjected to a torque in the direction opposite to the movement of the tape, but it is normally held motionless by a brake. Thus, all of the input energy to the gear box is applied through the first output shaft to the driving capstan.

When an error is detected, the forward transducer is disconnected from the output means, the rear transducer is connected thereto, and the brake is released from the turntable, permitting it to rotate through part of a revolution in a direction opposite to that of the movement of the tape. Thus, the rear transducer and the forward transducer exchange relative positions and the mutilated information is retransmitted. Constant relative speed is maintained between the transducer and the tape, since the input energy to the gear box remains constant and is divided between the first and second output shafts in accordance with the loads connected thereto.

Accordingly, it is a feature of my invention that a data transmission system include an information-bearing tape, a first transducer positioned adjacent to the tape, a second transducer positioned adjacent to the tape a predetermined distance from the first transducer along the direction of travel of the tape, output circuitry connected to the first transducer, control circuitry for connecting the output circuitry to the second transducer in response to an error signal, and apparatus responsive to the error signal for interchanging the relative positions of the first and second transducers relative to the tape.

Figure 2:
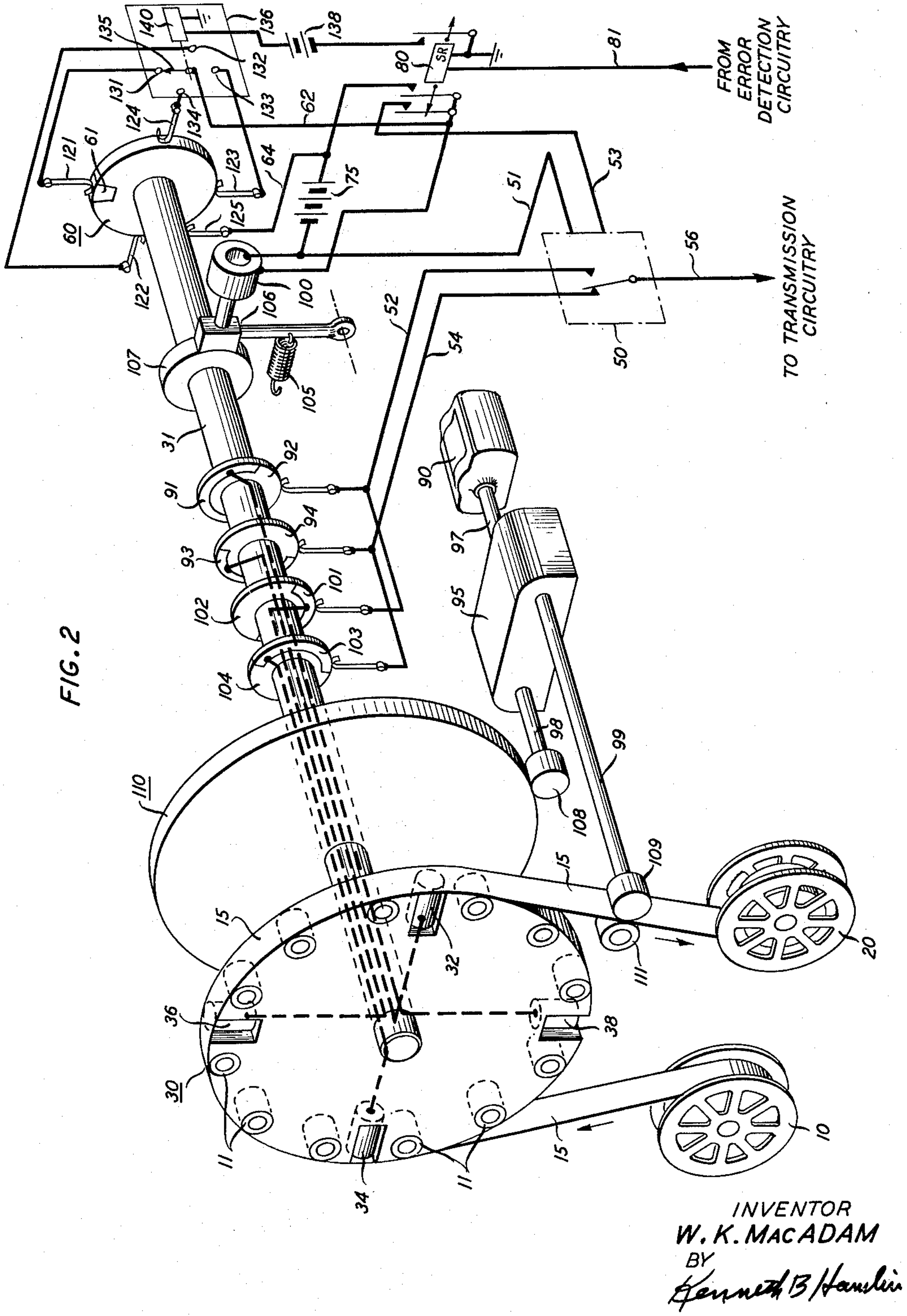

These and other objects and features of this invention will be better understood upon consideration of the following detailed description and the accompanying drawing, in which:

FIG. 1 is a schematic diagram of an illustrative embodiment in accordance with the principles of my invention; and FIG. 2 is a schematic diagram of an additional illustrative embodiment in accordance with the principles of my invention.

Referring more particularly to the drawing, in which like parts are referred to by like reference characters, FIG. 1 shows a schematic diagram of a data transmission system and the associated retransmission apparatus and circuitry. Information-bearing tape 15 is stored on reels 10 and 20, which rotate to let out and to take up tape 15. Sprocket holes in tape 15 are engaged by capstan 85 which, through shaft 84 coupled to motor 90, drives tape 15 in the direction indicated by the arrows adjacent tape 15. Of course, through proper placement of capstan 85 or through the use of another capstan, tape 15 could be driven in the opposite direction from that shown in FIG. 1.

Tape 15 passes over a portion of the circumference of turntable 30, supported by idler rollers 11 mounted therein. Turntable 30 includes sprocket wheels 42 and 44, each of which is mounted along the circumference thereof such that at least one wheel engages the sprocket holes in tape 15 at all times. Sprocket wheels 42 and 44 are driven through mechanical or electrical coupling, in a manner known in the art, by motors not shown, at a constant speed in the direction of travel of tape 15. This speed is substantially synchronous with the speed of capstan 85 during normal error-free operation. Pickup transducers, or sensing elements, 32 and 34 are mounted along the circumference of turntable 30 such that tape 15 passes adjacent to both transducers during normal operation. Advantageously, the location of sprocket wheels 42 and 44 and of pickup transducers 32 and 34 may be at points along the circumference of turntable 30 equidistant from each other, as illustrated in FIG. 1.

Turntable 30 is rigidly mounted on shaft 31, which is supported by supports not shown so as to be freely rotatable. Also rigidly mounted on shaft 31 are slip rings 45 and 46. Pickup transducers 32 and 34 are electrically connected to slip rings 45 and 46, respectively, as indicated by the dashed lines in FIG. 1. Slip rings 45 and 46 are connected through brushes and conductors 52 and 54, respectively, to individual inputs of flip-flop switch 50, the output of which is connected through conductor 56 to suitable transmission circuitry.

Commutator 60, composed of conductive material and having nonconductive segments 61 and 63, is also rigidly mounted on shaft 31. Electrical coupling is made to commutator 60 through brushes 68 and 69, which are in contact with nonconductive segments 63 and 61, respectively, during normal transmission. Brush 69 is connected through conductor 62 to one terminal of battery 75 and through conductors 62 and 82 to a "make" contact of relay 80. Brush 68 is connected through conductors 64 and 83 to the armature of relay 80. Conductor 64 is further connected through conductor 65 to conductors 53 and 73, the former of which is connected to one of the control inputs of flip-flop switch 50 and the latter of which is connected to one terminal of solenoid 70. The other terminal of solenoid 70 is connected through conductor 71 to the other terminal of battery 75 and through conductors 71 and 51 to another control input to flip-flop switch 50.

When solenoid 70 is energized through conductors 71 and 73, brake arm 78, which is pivotally mounted, is caused to apply pressure to drum 77, slowing the rotation of drum 77. Drum 77 is rigidly mounted on shaft 34 and thus energization of solenoid 70 slows capstan 85. Clutch 79 is provided for coupling motor 90 to shaft 84 to prevent overloading motor 90 when shaft 84 is slowed down.

Consider now the operation of the circuit of FIG. 1 which is shown in the normal operating condition. Reel 10 is letting out tape 15 which is being driven by capstan 85 and taken up on reel 20. Tape 15 passes over a portion of turntable 30, supported by idler rollers 11, and is engaged by sprocket wheel 44 which is rotating in the direction of tape travel at the same speed as that at which tape 15 is being driven. Thus, turntable 30 remains motionless during normal operation.

Flip-flop switch 50 connects forward pickup transducer 34 through slip ring 46 and conductors 54 and 56 to the transmission circuitry. It will be noted that relay 80 is in the open position and that brake arm 78 is not contacting drum 77. Brushes 68 and 69 are in contact with nonconductive segments 63 and 61 of commutator 60, and thus no electrical circuit exists between conductors 62 and 64.

When an error signal in the transmission of the data is detected and an error signal is applied to conductor 81 in a manner known in the art, relay 80 is energized. Relay 80 is preferably of the fast to operate, slow to release type and, upon receiving an error signal on conductor 81, operates rapidly to connect conductor 82 to conductor 83. This applies the potential of battery 75, through conductors 51 and 53, across the control inputs of flip-flop switch 50 such that switch 50 disconnects conductor 56 from conductor 54 and connects it to conductor 52. Thus, the transmission circuitry is connected through slip ring 45 to rear pickup transducer 32, which now performs the function of reading the information on tape 15 for transmission. The particular block of data that was transmitted improperly will have passed transducer 34, but it will not have passed transducer 32 before the transmission circuitry has been switched from transducer 34 to transducer 32 upon receipt of the error signal. Therefore, transducer 32 retransmits the information requested and then proceeds to transmit the succeeding information stored on tape 15.

At the same time, battery 75 is connected across solenoid 70 through conductors 71 and 73 when relay 80 is energized by the error signal. Solenoid 70 causes brake arm 78 to apply pressure to drum 77, thereby gradually slowing down capstan 85. Since sprocket wheel 44 is rotating at a constant speed, turntable 30 rotates in a direction opposite to the direction of tape travel. In the embodiment of FIG. 1, turntable 30 rotates in the counterclockwise direction, and the relative speed between tape 15 and transducer 32 is maintained substantially constant.

When the error signal is removed from conductor 81, relay 80 will open, but commutator 60 on shaft 31 will have rotated sufficiently such that brushes 68 and 69 will be electrically interconnected through the conductive segment of commutator 60, thus maintaining the battery connection across solenoid 70 and thereby the pressure of arm 78 on drum 77. When commutator 60 has proceeded through one-half of a revolution, brushes 68 and 69 will be in contact with nonconductive segments 61 and 63, respectively, and the circuit between battery 75 and solenoid 70 will be broken, thus deenergizing solenoid 70. In consequence, the pressure of brake arm 78 will be removed from drum 77, and drive capstan 85 will rapidly resume the same speed as that of sprocket wheels 42 and 44. Therefore, turntable 30 will cease to rotate and will again assume a motionless position.

The mechanical action of the rotation of turntable 30, through one-half revolution in the embodiment of FIG. 1, interchanges the relative position of transducers 32 and 34 with respect to tape 15. Pickup transducer 32 becomes the forward transducer and pickup transducer 34 becomes the rear transducer. Of course, sprocket wheels 42 and 44 also interchange relative physical positions, with sprocket wheel 42 engaging the sprocket holes of tape 15. At all times tape 15 maintains a constant forward speed relative to the transducer connected to the transmission circuitry.

In systems where conventional magnetic tape is used for the storage of information, it is advantageous to eliminate the need for sprocket holes in the tape and to employ some other method of driving the tape and of maintaining tape speed constant relative to the transducer. For example, friction drive is a method often employed for driving information-bearing tapes. Further, it may be advantageous to provide improved protection against errors arising in adjacent blocks of data on the tape. Such an embodiment in accordance with the principles of the invention, employing friction drive and providing additional pickup transducers for improved protection, is shown in FIG. 2 of the drawing.

The embodiment shown in FIG. 2 is similar to the embodiment of FIG. 1 in many respects. Reels 10 and 20 rotate to let out and take up tape 15 which passes over a portion of turntable 30, supported by idler rollers 11. The sprocket wheels 42 and 44 in the circuit of FIG. 1 have been replaced by additional pickup transducers 36 and 38 in the circuit of FIG. 2. Transducers 36 and 38 are electrically connected to conductive segments 101 and 91 of slip rings 102 and 92, respectively; and transducers 32 and 34 are electrically connected to conductive segments 93 and 103 of slip rings 94 and 104, respectively. Further, nonconductive segment 63 has been eliminated from commutator 60, and brushes 68 and 69 have been replaced by brushes 121, 122, 123 and 124 contacting the periphery of commutator 60 at points equidistant from each other in the circuit of FIG. 2. Brushes 121, 122, 123 and 124 are connected respectively to contacts 131, 132, 133 and 134 of rotary switch 136, wiper 135 of which is connected to conductor 62. Wiper 135 is driven through one-fourth revolution to succeeding contacts, in a clockwise manner in the circuit of FIG. 2, each time solenoid 140 is energized.

Differential gear box 95 is employed in the embodiment of FIG. 2 to forcibly relate rotation of turntable 30 to the speed of the tape drive so as to maintain a constant relative speed between tape 15 and the pickup transducer connected to the transmission circuitry. Gear box 95 has an input shaft 97 which is driven at a constant speed by motor 90. This input energy is coupled, in a manner known in the art, to output shafts 98 and 99 in accordance with their respective loading. Shaft 98 is rigidly connected to capstan 108, rotation of which may be coupled to drum 110 by friction or other suitable means. Shaft 99 is rigidly connected to capstan 109. Rotation of capstan 109 imparts longitudinal movement to tape 15 which is clamped between it and idler roller 111.

During normal operation, spring 105 causes brake arm 106 to apply sufficient pressure to drum 107 to hold shaft 31, to which drum 107 is rigidly connected, motionless. Since shaft 31 is held motionless and drum 110 is rigidly connected thereto, output shaft 98 is also held motionless.

Therefore, input energy through shaft 97 is applied to rotate output shaft 99, and thus capstan 109, to drive tape 15 at a constant speed appropriate to the particular data transmission system. Forward pickup transducer 34 is connected through slip ring 104, conductor 54, flip-flop switch 50 and conductor 56 to the transmission circuitry. It will be noted that the conductive segments 91, 93, 101 and 103 of slip rings 92, 94, 102 and 104 are arranged such that at all times at least one slip ring is electrically connected through its associated brush to conductor 52 and one slip ring is electrically connected through its associated brush to conductor 54.

The operation of the circuit of FIG. 2 is substantially similar to that of the circuit of FIG. 1. An error signal applied to conductor 81 energizes relay 80 to complete the battery circuit and apply the potential of battery 75 through conductors 51 and 53 across the control inputs of flip-flop switch 50. Conductor 56 is disconnected from conductor 54 and is connected to conductor 52, thereby connecting pickup transducer 36 to the transmission circuitry through slip ring 102. The information that was improperly transmitted through transducer 34 is then retransmitted through transducer 36 as the portion of tape 15 on which that information is stored passes adjacent to transducer 36.

Concurrently, energization of relay 80 by the error signal connects battery 75 across solenoid 100. Energization of solenoid 100 attracts brake arm 106 away from drum 107, such that the torque applied to drum 110 is sufficient to rotate shaft 31. Thus, since the input energy to gear box 95 is divided between output shafts 98 and 99, shaft 99 will decrease in speed as shaft 98 gains speed, the combined speed of the two output shafts remaining substantially constant. As shaft 99 decreases in speed, the speed of tape 15 decreases but the forward speed of tape 15 relative to transducer 36 remains constant because turntable 30 is being driven in a direction opposite to the direction of travel of tape 15 through the rotation of capstan 108 acting on drum 110.

It will be noted that energization of relay 80 by an error signal also connects battery 138 across solenoid 140, energizing it to drive wiper 135 to contact 132. Thus an electrical path is provided between conductors 62 and 64 through brush 125, commutator 60 and brush 122 to contact 132 and wiper 135 which maintains the battery connection across solenoid 100 after relay 80 opens when the error signal is removed from conductor 81. Battery 75 remains connected across solenoid 100 until commutator 60 has rotated through one-fourth revolution, placing nonconductive segment 61 in contact with brush 122, thus breaking the electrical connection between conductors 62 and 64. Solenoid 100 is deenergized and spring 105 causes brake arm 106 to apply pressure to drum 107, stopping the rotation of shaft 31. Accordingly, the rotation of shaft 98 is stopped and shaft 99 resumes its original speed of rotation.

At this point, the transducers on turntable 30 are in new positions relative to tape 15, transducer 36 now functioning as the forward transducer. Slip rings 92, 94, 102 and 104 have rotated through one-fourth revolution in a counterclockwise direction and the brush connected to conductor 52 remains in contact with conductive segment 101 of slip ring 102, and the brush connected to conductor 54 assumes contact with conductive segment 93 of slip ring 94. Thus, upon receipt of a subsequent error signal, flip-flop switch 50 will connect the transmission circuitry through conductor 54 and slip ring 94 to transducer 32.

The circuit shown in FIG. 2 provides improved protection for adjacent blocks of data over the circuit of FIG. 1 through the provision of more than two pickup transducers. Although a total of four transducers are provided on turntable 30 in FIG. 2, a greater number may be used effectively depending upon the requirements of the particular system. In the circuit of FIG. 2 it is assumed that two blocks of data are stored on a length of tape 15 equal to that between two adjacent transducers. Thus, four blocks of data are stored on the length of tape 15 between transducers 34 and 32.

In the circuit of FIG. 1, as transducer 32, connected to the transmission circuitry by an error signal, moves in the counterclockwise direction, a period of time will exist wherein transducer 34 will not be adjacent to tape 15. If a subsequent error signal is received during this period of time, it has no effect on flip-flop switch 50 and, since there is no rear transducer to transfer the transmission circuitry to, the request for retransmission is ignored.

However, in the circuit of FIG. 2, assuming that transducer 36 is connected to the transmission circuitry and is rotating toward the forward position in response to an error signal, transducer 32 is adjacent to tape 15 and is connected, upon rotation, through slip ring 94 to conductor 54. Upon receipt of a subsequent error signal, energizing relay 80, battery 75 is again connected across the control inputs of switch 50, switching the transmission circuitry to conductor 54 and transducer 32. Shaft 31 is directed to continue through an additional one-fourth revolution since the subsequent error signal caused solenoid 140 to drive rotary switch 136 to contact 133. Therefore, commutator 60 will maintain the connection of battery 75 across solenoid 100 until nonconductive segment 121 has rotated to brush 123, breaking the circuit connection. When solenoid 100 is deenergized, spring 105 applies brake arm 106 to drum 107, stopping rotation of shaft 31 as described hereinbefore, and transducer 32 assumes the forward position with respect to the direction of travel of tape 15.

It is understood that the above-described arrangements are merely illustrative of the application of the principles of the invention. Numerous other arrangements may be devised by those skilled in the art without departing from the spirit and scope of the invention.

What is claimed is:

1. In a data transmission system the combination comprising a continuously moving tape, a first pickup transducer positioned adjacent said tape, a second pickup transducer positioned adjacent said tape a predetermined distance along the direction of travel of said tape from said first transducer, output means, means for connecting said output means to said first transducer, means responsive to an error signal for connecting said output means to said second transducer, and means responsive to said error signal for interchanging the relative position of said first and said second transducer with respect to said tape.

2. In a data transmission system in accordance with claim 1 wherein said means for interchanging the relative position of said first and said second transducer with respect to said tape comprises means for moving said second transducer in a direction opposite to the direction of travel of said tape to a position formerly occupied by said first transducer and concurrently moving said first transducer to a position formerly occupied by said second transducer.

3. The combination defined in claim 2 in combination with means for maintaining the velocity of said tape constant with respect to said second transducer.

4. In a data transmission system, means for retransmitting information in response to an error signal comprising in combination an information-bearing tape, means for driving said tape, a plurality of sensing elements a predetermined distance from each other and disposed adjacent to said tape and along the direction of travel thereof, output means, means connecting a first one of said sensing elements to said output means, means responsive to said error signal for connecting said output means to a second one of said sensing elements positional along the direction of travel of said tape from said first one of said sensing elements, and means responsive to said error signal for moving said second one of said sensing elements to the relative position of said first one of said sensing elements with respect to said tape.

5. In a data transmission system the combination comprising a plurality of pickup transducers positioned at predetermined distances from each other, an information-bearing tape disposed adjacent to at least two of said transducers, means for driving said tape, output means, means for connecting said output means to one of said transducers adjacent to said tape, means responsive to an error signal for connecting said output means to another of said transducers adjacent to said tape and disposed from said one of said transducers in the direction of travel of said tape, means responsive to said error signal for moving said other transducer to the relative position of said one transducer with respect to said tape, and means for positioning said one transducer a predetermined distance from said other transducer in the direction of travel of said tape.

6. In a data transmission system the combination comprising a turntable having a plurality of transducers positioned thereon, a tape disposed adjacent to more than one of said transducers, means for driving said tape, output means, means connecting said output means to a first one of said transducers adjacent to said tape, means responsive to an error signal for connecting said output means to a second one of said transducers adjacent to said tape and positioned a predetermined distance from said first transducer in the direction of travel of said tape, means responsive to said error signal for rotating said turnable in a direction opposite to the direction of travel of said tape, and means for maintaining the speed of travel of said tape constant with respect to the transducer connected to said output means.

7. In a data transmission system the combination comprising means for storing information, first transducer means disposed for reading said information, output means, means connecting said first transducer means to said output means, and means for retransmitting information in response to an error signal including second transducer means disposed for reading said information and preceding said first transducer means in time relative to said information, means responsive to said error signal for connecting said output means to said second transducer means, and means responsive to said error signal for positioning said first transducer means for reading information preceding in time that being read by said second transducer means.

8. In a data transmission system the combination comprising a rotatable turntable having a plurality of pickup transducers positioned in the periphery thereof, a tape disposed along the periphery of said turntable adjacent to at least two of said transducers, drive means coupled to said tape for driving said tape at a predetermined speed, a plurality of sprocket wheels positioned in the periphery of said turntable constantly rotating at said predetermined speed, means coupling at least one of said sprocket wheels to said tape, output means, means for connecting said output means to a first one of said transducers adjacent to said tape, means responsive to an error signal for connecting said output means to a second one of said transducers adjacent to said tape and positioned a predetermined distance from said first transducer in the direction of travel of said tape, and means responsive to said error signal for decreasing the speed of said tape such that said turntable rotates in a direction opposite to the direction of travel of said tape and moves said second transducer to a position with respect to said tape formerly occupied by said first transducer.

9. In a data transmission system the combination comprising a rotatable turntable having a plurality of pickup transducers positioned in the periphery thereof, a tape disposed along the periphery of said turntable adjacent to at least two of said transducers, differential gear means having an input shaft and first and second output shafts, drive means coupled to said input shaft rotating at a constant speed, means coupling said first output shaft to said tape for driving said tape at a predetermined velocity, means coupling said second output shaft to said turntable, output means, means connecting said output means to a first one of said transducers adjacent to said tape, means responsive to an error signal for connecting said output means to a second one of said transducers adjacent to said tape and positioned a predetermined distance from said first transducer in the direction of travel of said tape, and means responsive to said error signal for permitting said second output shaft to rotate such that said turntable rotates in a direction opposite to the direction of travel of said tape and moves said second transducer to a position with respect to said tape formerly occupied by said first transducer.

10. In a data transmission system the combination comprising a rotatable turntable having a plurality of pickup transducers positioned thereon, a tape disposed adjacent to at least two of said transducers, drive means coupled to said tape for driving said tape at a predetermined velocity, output means, means connecting said output means to a first one of said transducers adjacent to said tape, means responsive to an error signal for connecting said output means to a second one of said transducers adjacent to said tape and positioned a predetermined distance from said first transducer in the direction of travel of said tape, means responsive to said error signal for decreasing the velocity of said tape, and means responsive to a decrease in velocity of said tape for rotating said turntable in a direction opposite to the direction of travel of said tape whereby said second transducer moves to a position formerly occupied by said first transducer and the velocity of said tape remains constant with respect to said second transducer.

References Cited in the file of this patent

UNITED STATES PATENTS 2,539,837 Howell ---------------- Jan. 30, 1951
2,755,422 Livingston ------------- July 17, 1956